United States Patent
Bull et al.

(10) Patent No.: US 10,909,320 B2
(45) Date of Patent: Feb. 2, 2021

(54) ONTOLOGY-BASED DOCUMENT ANALYSIS AND ANNOTATION GENERATION

(71) Applicant: International Business Machines Corporation, Armonk, NY (US)

(72) Inventors: Brendan Bull, Durham, NC (US); Paul Lewis Felt, Utah County, UT (US); Andrew Hicks, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 16/270,431

(22) Filed: Feb. 7, 2019

(65) Prior Publication Data
US 2020/0257761 A1 Aug. 13, 2020

(51) Int. Cl.
*G06F 17/20* (2006.01)
*G06F 40/289* (2020.01)
*G06F 16/93* (2019.01)
*G06F 40/30* (2020.01)

(52) U.S. Cl.
CPC ............ *G06F 40/289* (2020.01); *G06F 16/93* (2019.01); *G06F 40/30* (2020.01)

(58) Field of Classification Search
CPC ........ G06F 16/35; G06F 16/93; G06F 40/289; G06F 40/30
See application file for complete search history.

(56) References Cited

U.S. PATENT DOCUMENTS

| 8,429,179 B1 * | 4/2013 | Mirhaji | G06F 16/3344 707/756 |
| 9,058,374 B2 * | 6/2015 | Brennan | G06F 40/258 |
| 2003/0177000 A1 * | 9/2003 | Mao | G06F 40/247 704/9 |

(Continued)

FOREIGN PATENT DOCUMENTS

| WO | 2017151757 A1 | 9/2017 |
| WO | 2018046452 A1 | 3/2018 |

OTHER PUBLICATIONS

Jagannatha et al., Bidirectional RNN for Medical Event Detection in Electronic Health Records, Proceedings Conference (available at https://www.ncbi.nlm.nih.gov/pmc/articles/PMC5119627/) (Year: 2016).*

(Continued)

*Primary Examiner* — Shahid K Khan
(74) *Attorney, Agent, or Firm* — Patterson + Sheridan, LLP

(57) ABSTRACT

Techniques for cognitive annotation are provided. An electronic document including textual data is received. A plurality of importance scores are generated for a plurality of words included in the electronic document by processing the electronic document using a trained passage encoder. Important words are identified based on the plurality of importance scores. One or more clusters of words are generated, where each of the one or more clusters of words includes at least one of the plurality of important words. A representative word is selected for a first cluster, and the representative (Continued)

word is mapped to one or more concepts from a predefined list of concepts. The one or more concepts are disambiguated to identify a set of relevant concepts for the electronic document. An annotated version of the electronic document is generated based at least in part on the set of relevant concepts.

14 Claims, 6 Drawing Sheets

(56) References Cited

U.S. PATENT DOCUMENTS

| | | | | |
|---|---|---|---|---|
| 2008/0270120 | A1* | 10/2008 | Pestian | G06F 40/117 704/9 |
| 2011/0191098 | A1* | 8/2011 | Thomas | G06F 40/20 704/9 |
| 2013/0031097 | A1* | 1/2013 | Sutter | G06F 16/313 707/737 |
| 2014/0181128 | A1* | 6/2014 | Riskin | G06F 16/3344 707/756 |
| 2016/0350362 | A1* | 12/2016 | Charlot | G06F 16/36 |
| 2018/0011931 | A1* | 1/2018 | Modani | G06F 40/211 |
| 2020/0035229 | A1* | 1/2020 | Solanki | G10L 15/22 |

OTHER PUBLICATIONS

Mai et al., "Using Deep Learning for Title-Based Semantic Subject Indexing to Reach Competitive Performance to Full-Text," arXiv:1801.06717v2 [cs.DL] May 29, 2018, 10 pages.

Del Fiol et al, "A Deep Learning Method to Automatically Identify Reports of Scientifically Rigorous Clinical Research from the Biomedical Literature: Comparative Analytic Study," J Med Internet Res. Jun. 2018; 20(6): e10281. Published online Jun. 25, 2018. doi: 10.2196/10281, 20 pages.

* cited by examiner

ONTOLOGY-BASED DOCUMENT ANALYSIS AND ANNOTATION GENERATION

BACKGROUND

The present disclosure relates to document analysis, and more specifically, to cognitively annotating electronic documents to improve search functionality.

In a large variety of fields, documentation and literature is collected and evaluated in order to research new or old issues, and to expand understanding. For example, in the legal field, documents including court opinions, treatises, articles, and the like are frequently collected to allow users to search through the available literature in order to determine how to proceed. Similarly, users in medical fields frequently utilize medical corpora to identify potential treatment options. In order to improve the functionality and accessibility of these corpora, subject matter experts can take the time to read through the documents and write labels, headings, annotations, tags, and the like. However, this process is expensive and time-consuming. Given the pace with which new documents become available, it is not practical to maintain these annotations for the entire corpus. Further, these annotations are inherently subjective, and frequently include mistakes. These incomplete or inaccurate headings make searching and indexing of the documents far less effective and accurate.

SUMMARY

According to one embodiment of the present disclosure, a method is provided. The method includes receiving an electronic document including textual data. The method further includes generating a plurality of importance scores for a plurality of words included in the electronic document by processing the electronic document using a trained passage encoder. Additionally, the method includes identifying a plurality of important words, from the plurality of words, based on the plurality of importance scores. The method also includes generating one or more clusters of words, from the plurality of important words, wherein each of the one or more clusters of words includes at least one of the plurality of important words. A representative word is selected for a first cluster of the one or more clusters of words, and the representative word for the first cluster is mapped to one or more concepts from a predefined list of concepts. The method additional includes disambiguating, by operation of one or more computer processors, the one or more concepts to identify a set of relevant concepts for the electronic document. Finally, the method includes generating an annotated version of the electronic document based at least in part on the set of relevant concepts.

According to a second embodiment of the present disclosure, a computer-readable storage medium is provided. The computer-readable storage medium has computer-readable program code embodied therewith, which is executable by one or more computer processors to perform an operation. The operation includes receiving an electronic document including textual data. The operation further includes generating a plurality of importance scores for a plurality of words included in the electronic document by processing the electronic document using a trained passage encoder. Additionally, the operation includes identifying a plurality of important words, from the plurality of words, based on the plurality of importance scores. The operation also includes generating one or more clusters of words, from the plurality of important words, wherein each of the one or more clusters of words includes at least one of the plurality of important words. A representative word is selected for a first cluster of the one or more clusters of words, and the representative word for the first cluster is mapped to one or more concepts from a predefined list of concepts. The operation additional includes disambiguating the one or more concepts to identify a set of relevant concepts for the electronic document. Finally, the operation includes generating an annotated version of the electronic document based at least in part on the set of relevant concepts.

According to a second embodiment of the present disclosure, a system is provided. The system includes a memory containing a program which when executed by the one or more computer processors performs an operation. The operation includes receiving an electronic document including textual data. The operation further includes generating a plurality of importance scores for a plurality of words included in the electronic document by processing the electronic document using a trained passage encoder. Additionally, the operation includes identifying a plurality of important words, from the plurality of words, based on the plurality of importance scores. The operation also includes generating one or more clusters of words, from the plurality of important words, wherein each of the one or more clusters of words includes at least one of the plurality of important words. A representative word is selected for a first cluster of the one or more clusters of words, and the representative word for the first cluster is mapped to one or more concepts from a predefined list of concepts. The operation additional includes disambiguating the one or more concepts to identify a set of relevant concepts for the electronic document. Finally, the operation includes generating an annotated version of the electronic document based at least in part on the set of relevant concepts.

DETAILED DESCRIPTION

In embodiments of the present disclosure, techniques for automatic annotation of electronic documents are provided. In an embodiment, documents are analyzed in the context of an ontology to identify important concepts in the document, cluster concepts with overlapping meaning, and disambiguate concepts with multiple meanings. Advantageously, this intelligent generation of annotations allows textual documents to be efficiently analyzed, labeled, and classified.

These annotations dramatically improve the functionality of the corpus, as the labels allow it to be effectively indexed and searched. In turn, systems that rely on the annotated corpora are improved. For example, machine learning systems that ingest data during training rely heavily on accurate labels for the input. By utilizing embodiments of the present disclosure, these systems can be trained more rapidly, using more accurate data, which improves their functionality.

Figure 1:
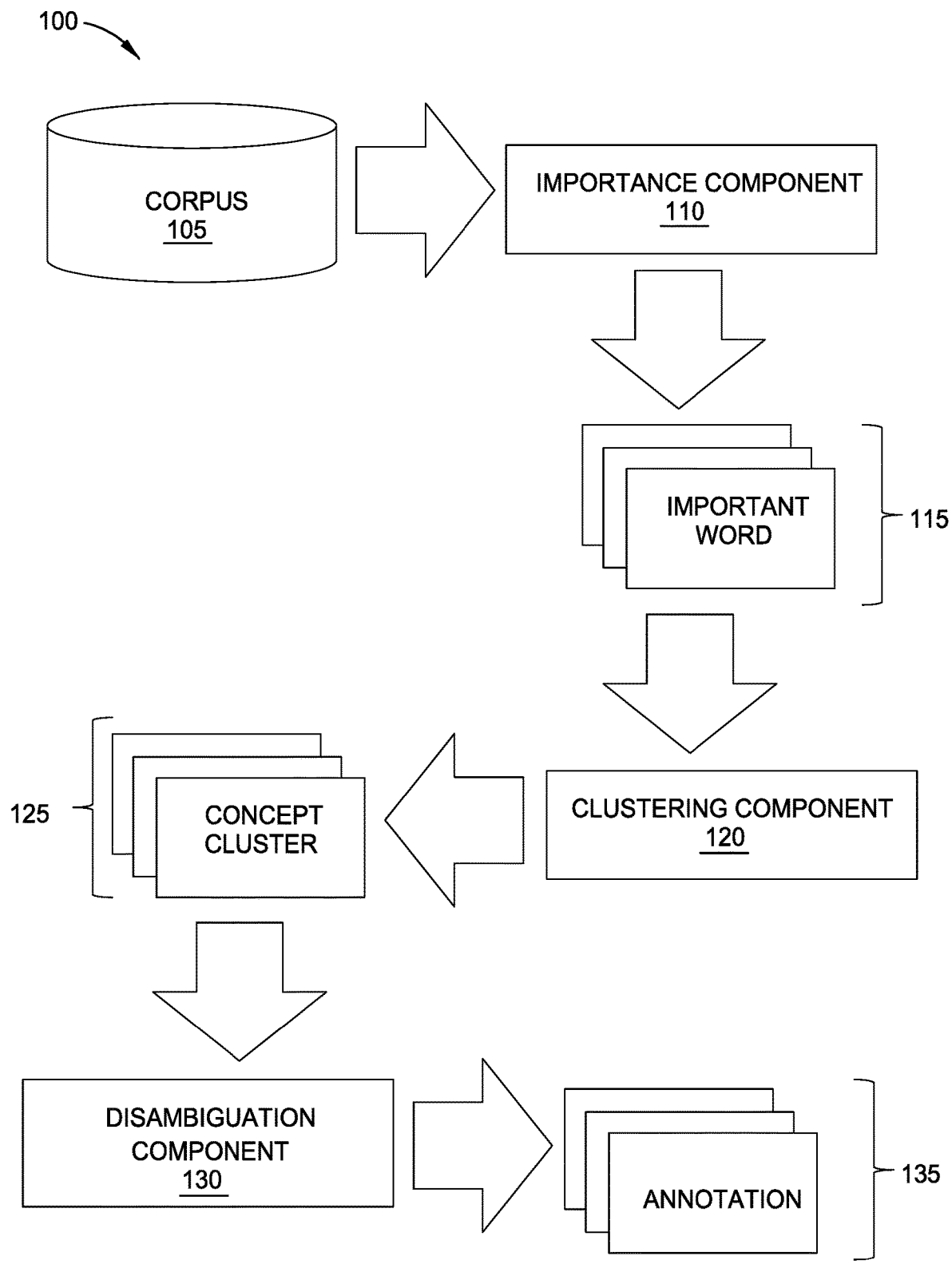
FIG. 1 illustrates a workflow for dynamically analyzing and generating annotations for electronic documents, according to one embodiment disclosed herein.

FIG. 1 illustrates a workflow 100 for dynamically analyzing and generating annotations for electronic documents, according to one embodiment disclosed herein. In the illustrated embodiment, a Corpus 105 of electronic documents is accessed by an Importance Component 110, which processes each document in turn. In an embodiment, the Corpus 105 comprises electronic documents that include text. In some embodiments, the Corpus 105 pertains to a particular domain, field, or type of document. In some embodiments described herein, medical documents are used as an example. However, these examples are not limiting on the present disclosure, and embodiments of the present disclosure are applicable to any domain or field.

As illustrated, the Importance Component 110 generates a set of Importance Words 115 for each document in the Corpus 105. In one embodiment, the Importance Component 110 assigns an importance score to each word found in the text of the respective document. In some embodiments, the Importance Component 110 utilizes a trained recurrent neural network (RNN) based passage encoder to identify important words that provide a coarse summary of the document. In one embodiment, the passage encoder is trained to identify words that are found relatively frequently with respect to the particular document, but relatively rarely with respect to an overall body of literature (e.g., within a particular domain). In some embodiments, the importance scores range from zero to one, with a higher score indicating a higher importance for the corresponding word, with respect to the document.

In the illustrated embodiment, in addition to generating an importance score for each word in the document, the Importance Component 110 also identifies a set of Important Words 115, based on these scores. For example, in one embodiment, the Importance Component 110 ranks the words based on their importance scores, and classifies the top N words (or the top M percent of words) as important. In embodiments, the number or percentage of words to classify as "important" can be adjusted by a user. In another embodiment, the Importance Component 110 utilizes a predefined threshold (which may be user-configurable), and classifies all words with an importance score exceeding this threshold as Important Words 115. In yet another embodiment, the Importance Component 110 determines an expected score of each word in the document (e.g., based on the total number of words in the document) and identifies any words with a generated score that exceeds this expected score. These identified words can then be classified as "important" to the document.

In the illustrated embodiment, once the Importance Component 110 has scored each word in the document (and optionally determined a set of Important Words 115), a Clustering Component 120 analyzes the words to generate one or more Concept Clusters 125. In some embodiments, the Clustering Component 120 only clusters words that have been classified as Important Words 115. In one embodiment, the Clustering Component 120 processes all of the words, regardless of whether they are considered "important." In one embodiment, the Clustering Component 120 generates a vector representation for each word, and clusters the words into one or more groups based on their relative locations in the embedding space. For example, in one embodiment, the Clustering Component 120 computes a similarity measure (e.g., the cosine similarity) for each pair of words, and clusters words based on this similarity. In some embodiments, the Clustering Component 120 clusters words with a similarity that exceeds a predefined threshold (e.g., 0.85).

In some embodiments, the Clustering Component 120 accesses an ontology to determine a semantic meaning for each word. In embodiments, the ontology indicates relationships between words or concepts, and can be used to identify words or concepts that are related or overlapping in meaning. In some embodiments, the Clustering Component 120 groups the words based on their semantic meanings. For example, in one embodiment, the Clustering Component 120 can determine that a first word refers to a type of medication, and a second word is a particular brand name for the medication. In an embodiment, the Clustering Component 120 can therefore cluster the two words into a single group. In embodiments, the Clustering Component 120 may utilize the vector-based similarity of the words, their semantic meanings, and/or any other factors when generating the Concept Clusters 125.

In an embodiment, once the Concept Clusters 125 have been generated, the Clustering Component 120 selects a representative word for each cluster, and adjusts its importance score. For example, in one embodiment, the Clustering Component 120 selects, for each Concept Cluster 125, the word having the highest importance score 115 in the cluster, and uses this word as representative of the cluster. In one embodiment, modifying the importance score of this representative word includes summing the importance scores of all of the words included in the cluster, and using this sum as the new score for the representative word (and thus, for the Concept Cluster 125).

In the illustrated embodiment, these Concept Clusters 125 (or the representative word associated with each cluster) are then provided to a Disambiguation Component 130, which resolves potential ambiguity associated with each representative word in order to determine the correct concept. For example, suppose one representative word is "depression." Depending on the context that the word was used in, this may refer to a depressive disorder (e.g., a mental condition), an economic decline or recession, or a physical recess or concavity. In an embodiment, for any potentially ambiguous representative words (e.g., for any words that are associated with two or more concepts in the ontology), the Disambiguation Component 130 analyzes the remaining text of the corresponding document based on the ontology, in order to determine which concept or underlying meaning was intended.

As illustrated, once the concepts are disambiguated, they are then used as annotations, tags, labels, or headings for the corresponding document. Advantageously, these annotations allow the document to be indexed effectively. This indexing allows the annotated Corpus 105 to be efficiently stored and maintained. Further, based on these annotations, the documents can be placed in an embedding space, to understand their relatedness. This additional information improves the functionality of the Corpus 105 by providing added understanding and depth. Further, these annotations enable effective keyword searching of the annotated Corpus 105, which can dramatically improve how users interact with the literature.

In some embodiments, the workflow 100 additionally includes operations to map the words or concepts to one or more predefined dictionaries or definitions. In one embodiment, after the Clustering Component 120 generates the Concept Clusters 125, the representative words are mapped to a predefined list of concepts. For example, in one embodiment, the words are mapped to the Unified Medical Language System (UMLS) Concept Unique Identifiers (CUIs). In some embodiments, the Disambiguation Component 130 acts to disambiguate these CUIs, based in part on the ontology defined by the UMLS CUIs. Further, in at least one embodiment, after the concepts have been disambiguated, the concepts are mapped to predefined terms, words, or phrases that enable textual searching. For example, in one embodiment, if CUIs are used to define the concepts, the CUIs are mapped to Medical Subject Heading (MeSH) terms, which are used as the Annotations 135.

Figure 2:
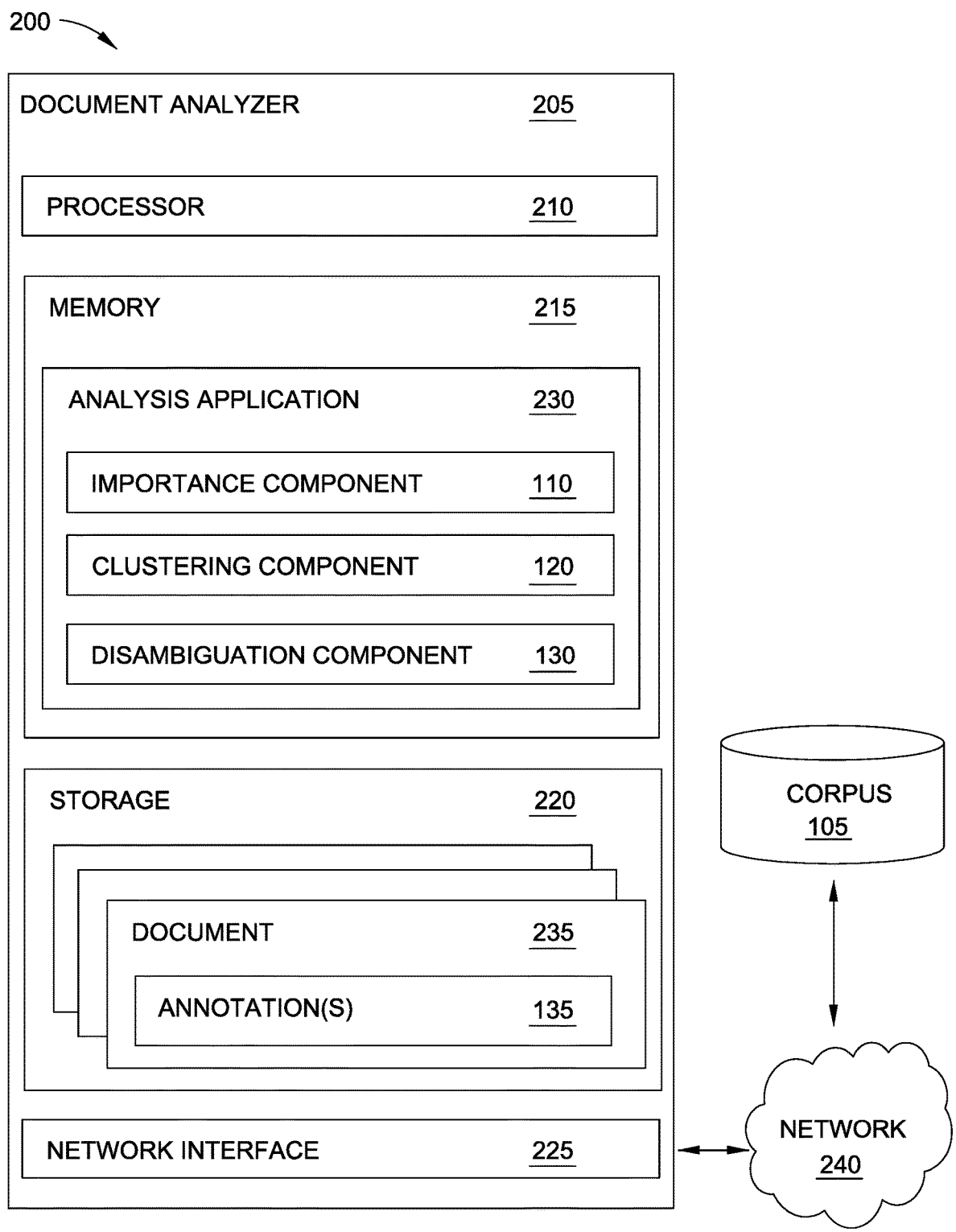
FIG. 2 is a block diagram illustrating a document analyzer configured to analyze and classify electronic documents, according to one embodiment disclosed herein.

FIG. 2 is a block diagram illustrating a Document Analyzer 205 configured to analyze and classify electronic documents, according to one embodiment disclosed herein. As illustrated, the Document Analyzer 205 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Via the Network Interface 225, the Document Analyzer 205 can be communicatively coupled with other devices including clients or user equipment, one or more Corpora 105, and the like.

In the illustrated embodiment, the Document Analyzer 205 is communicatively coupled to the Corpus 105 via a Network 240. In embodiments, this connection may wired, wireless, or a combination of wired and wireless links. In one embodiment, the Network 240 is the Internet. Although a single Corpus 105 is illustrated, in embodiments, the Document Analyzer 205 may interact with any number of corpora. Additionally, although illustrated as residing remotely from the Document Analyzer 205, in embodiments, the Corpus 105 may be stored locally (e.g., in Storage 220). Further, although not included in the illustrated embodiment, in embodiments, the Document Analyzer 205 may also be communicatively coupled (e.g., via the Network 240) with one or more user devices.

As illustrated, the Storage 220 includes a set of Documents 235, each with corresponding Annotation(s) 135. In an embodiment, these annotated Documents 235 collectively make up one or more annotated corpora, which is readily able to be indexed and searched. In one embodiment, the Documents 235 are retrieved from the Corpus 105 and analyzed by the Document Analyzer 205 to generate the Annotations 135. Although illustrated as residing in Storage 220, in embodiments, the Documents 235 can be stored in any suitable location. For example, in one embodiment, the Document Analyzer 205 generates Annotations 135, and stores them with their corresponding Document 235 in the Corpus 105. In embodiments, the Annotations 135 are terms, phrases, words, labels, concepts, headings, tags, or other similar data that summarizes the corresponding document and enables efficient searching.

In the illustrated embodiment, the Memory 215 includes an Analysis Application 230, which includes an Importance Component 110, a Clustering Component 120, and a Disambiguation Component 130. Although illustrated as a program residing in Memory 215, in embodiments, the functionality of the Analysis Application 230 can be implemented using software, hardware, or a combination of software and hardware. Further, although depicted as discrete components for illustration, in embodiments, the functionality and operations Importance Component 110, Clustering Component 120, and Disambiguation Component 130 may be combined or distributed among any number of components, each of which may be implemented via software, hardware, or a combination of both software and hardware.

In an embodiment, as discussed above, the Importance Component 110 generates an importance score for each word in a selected Document 235, and identifies one or more words to classify as "important." Further, in an embodiment, the Clustering Component 120 groups these important words into clusters based on a word-embedding, semantic meaning of each word, or a combination of the two. Additionally, in the illustrated embodiment, the Disambiguation Component 130 determines whether any of the words or concepts has multiple potential meanings. If so, the Disambiguation Component 130 disambiguates the words based on analyzing the words in the context of the remaining text of the document and a defined ontology, in order to generate the final Annotations 135.

Figure 3:
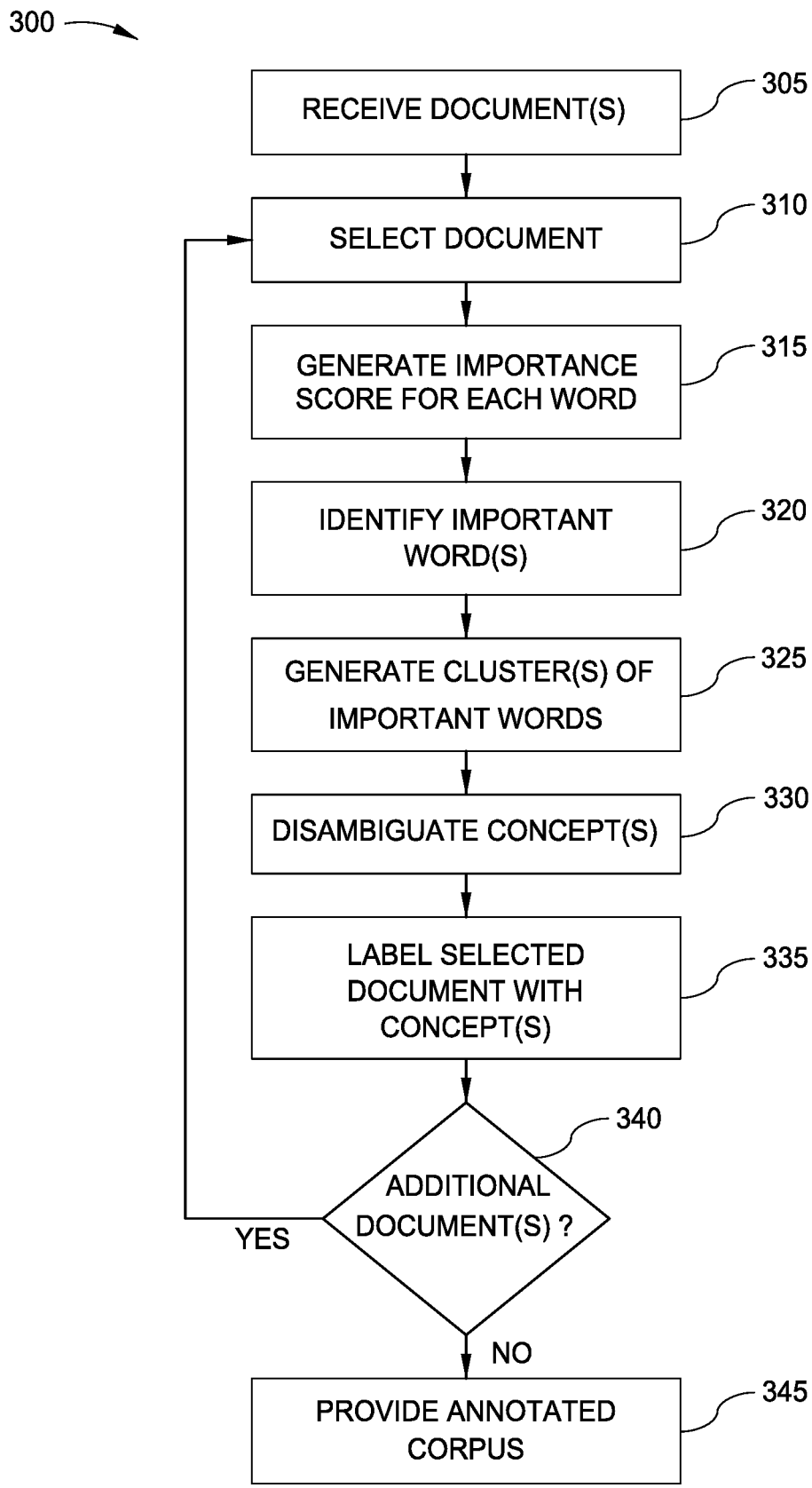
FIG. 3 is a flow diagram illustrating a method for annotating electronic documents to enable improved search functionality, according to one embodiment disclosed herein.

FIG. 3 is a flow diagram illustrating a method 300 for annotating electronic documents to enable improved search functionality, according to one embodiment disclosed herein. The method 300 begins at block 305, where an Analysis Application 230 receives one or more documents (e.g., from a Corpus 105) to be annotated. In some embodiments, a user can provide the one or more documents for processing. The method 300 then proceeds to block 310, where the Analysis Application 230 selects a document from the received set of document(s). At block 315, the Analysis Application 230 generates an importance score for each word in the text of the selected document. As discussed above, in one embodiment, the Analysis Application 230 processes the text of the document using a trained RNN-based passage encoder to generate a respective importance score for each respective word. The method 300 then proceeds to block 320.

At block 320, the Analysis Application 230 identifies one or more important words in the textual document, based at least in part on the importance scores. In an embodiment, the remaining words are then discarded. At block 325, the Analysis Application 230 generates one or more clusters of words from the set of important words, based on their similarity (e.g., their vector similarity and/or their semantic similarity). The method 300 then continues to block 330, where the Analysis Application 230 determines the relevant concept(s) represented by each cluster or word, and disambiguates the identified concepts. For example, as discussed above, if one of the important words (or the representative word of a cluster) is associated with two or more concepts or meanings, as determined by accessing an ontology, the Analysis Application 230 utilizes natural language processing (NLP) to analyze the remaining text of the selected document to determine which concept or meaning is correct.

The method 300 then proceeds to block 335, where the Analysis Application 230 labels the selected document with the disambiguated important words or concepts. In this way, the document can be indexed and searched effectively. At block 340, the Analysis Application 230 determines whether there is at least one additional document yet to be processed. If so, the method 300 returns to block 310. Otherwise, the method 300 continues to block 345. At block 345, the Analysis Application 230 provides the annotated corpus as an indexed and searchable set of documents. In one embodiment, this includes storing the determined annotations in association with the respective document in the Corpus 105, and allowing users to access and search the Corpus 105.

Figure 4:
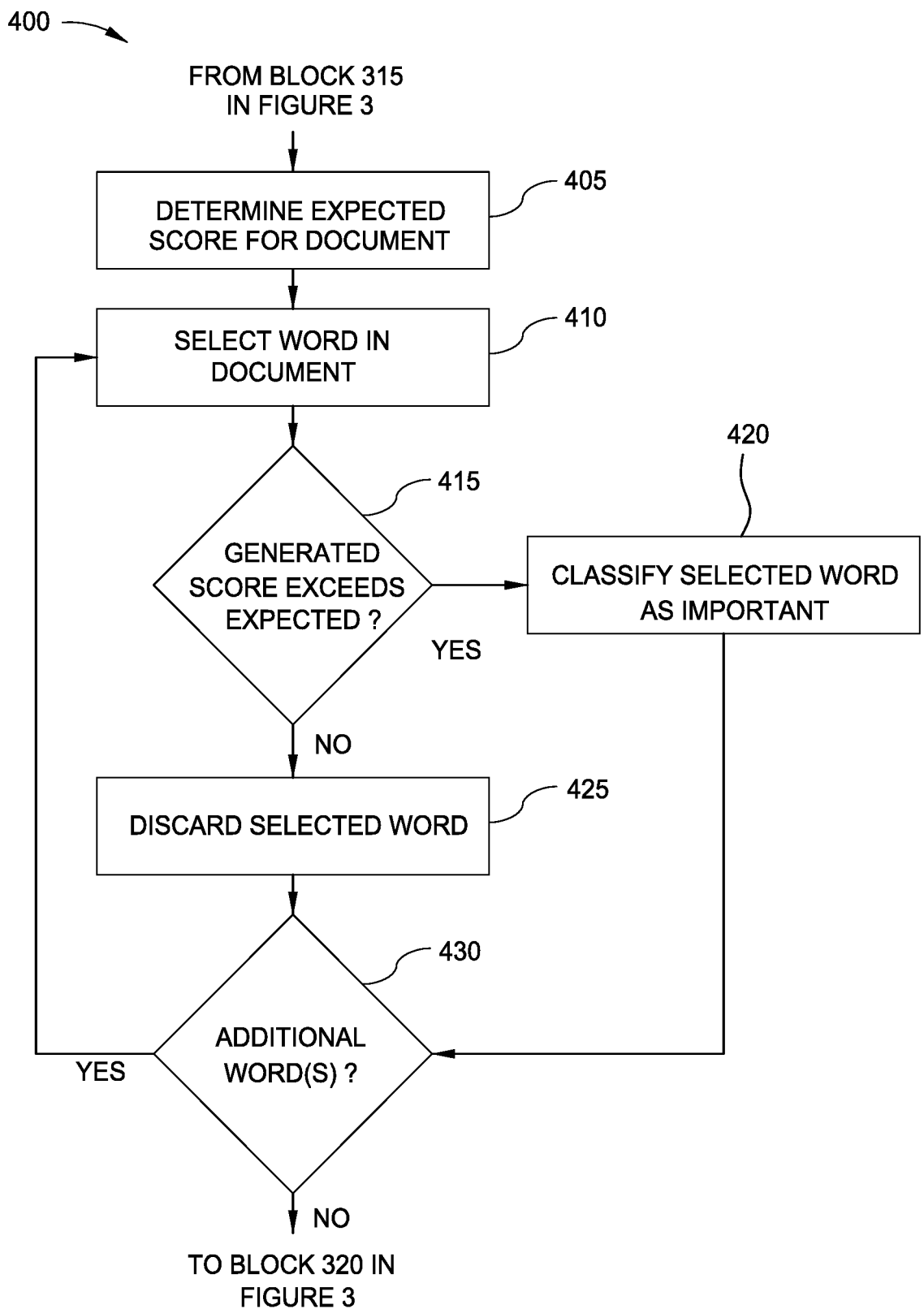
FIG. 4 is a flow diagram illustrating a method for identifying important words in an electronic document, according to one embodiment disclosed herein.

FIG. 4 is a flow diagram illustrating a method 400 for identifying important words in an electronic document, according to one embodiment disclosed herein. In the illustrated embodiment, the method 400 provides additional detail for block 320 of FIG. 3. The method 400 begins at block 405, where the Importance Component 110 determines an expected score for each word in the selected document. In one embodiment, the expected score is based on the number of words in the text to be analyzed. For example, if there are one hundred words, the average or expected importance score for each word is one divided by one hundred (0.01). That is, if each word was equally important, each word would have identical importance scores, and the importance score would be equal to one divided by the number of words in the text. The method 400 then proceeds to block 410.

At block 410, the Importance Component 110 selects a first word in the text. At block 415, the Importance Component 110 determines whether the generated importance score for the selected word is greater than the expected or average importance score for words in the document. If so, the method 400 proceeds to block 420, where the Importance Component 110 classifies the word as "important" with respect to the selected document. The method then proceeds to block 430. If the generated importance score is less than the expected or average score, the method 400 proceeds to block 425, where the Importance Component 110 discards the selected word. That is, the Importance Component 110 does not process the word any further (except potentially to provide context to disambiguate other words, as discussed above), and does not use the word as an annotation for the document. The method 400 then continues to block 430. At block 430, the Importance Component 110 determines whether there is at least one additional word to be evaluated. If so, the method 400 returns to block 410, where the Importance Component 110 selects the next word for evaluation. Otherwise, the method 400 terminates.

Figure 5:
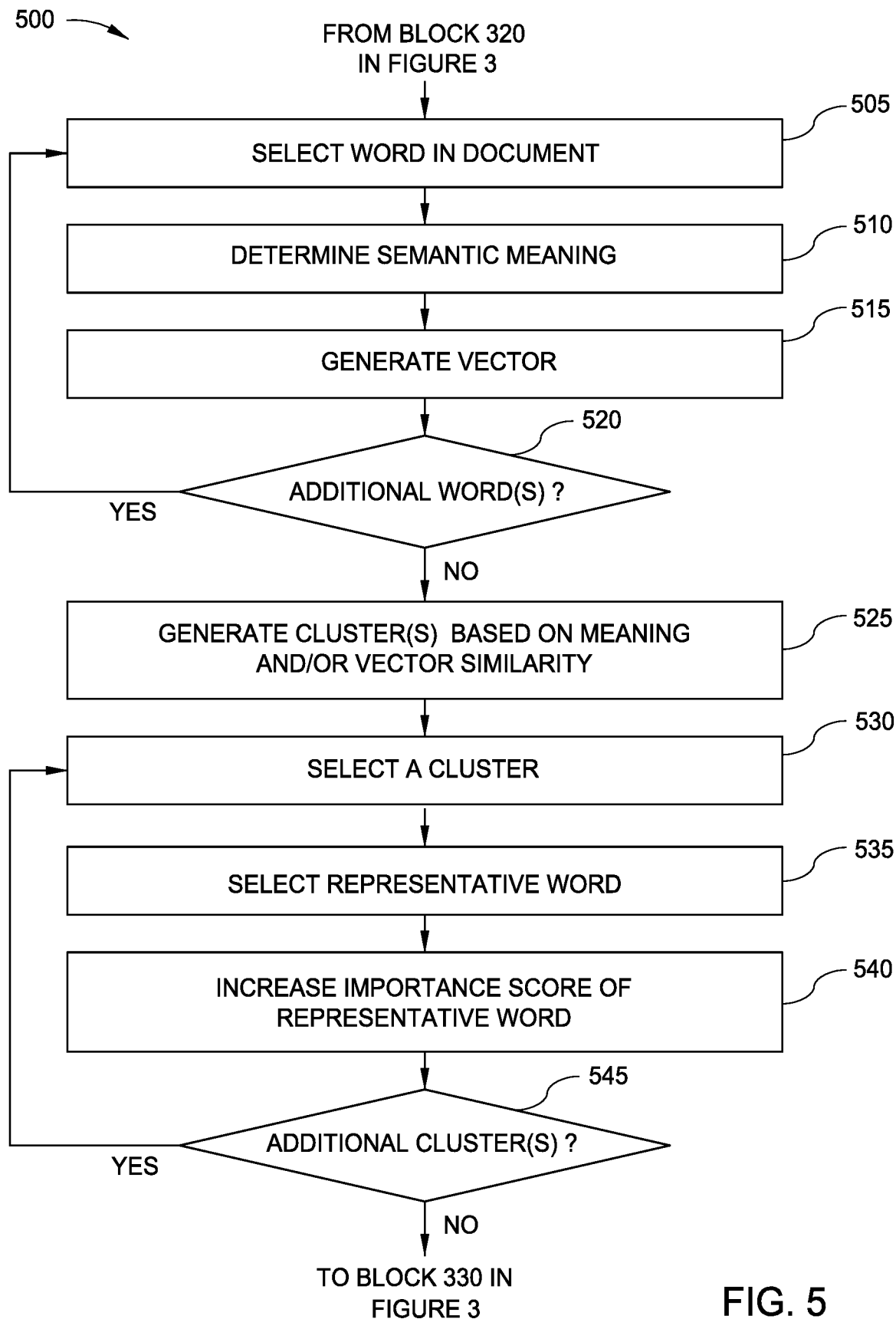
FIG. 5 is a flow diagram illustrating a method for clustering words based on underlying concepts, according to one embodiment disclosed herein.

FIG. 5 is a flow diagram illustrating a method 500 for clustering words based on underlying concepts, according to one embodiment disclosed herein. In the illustrated embodiment, the method 500 provides additional detail for block 325 of FIG. 3. The method 500 begins at block 505, where the Clustering Component 120 selects a word in the text of the selected document. In one embodiment, the Clustering Component 120 only evaluates words that have been classified as "important" by the Importance Component 110. In other embodiments, the Clustering Component 120 analyzes all of the words, even if they are not flagged as important. In an embodiment, this can ensure that the score assigned to the representative word for a given cluster includes the importance score of these unimportant words that are nevertheless included in the group.

At block 510, the Clustering Component 120 optionally determines the semantic meaning of the selected word based on one or more dictionaries or ontologies. The method 500 then continues to block 515, where the Clustering Component 120 generates a vector representation for the selected word. At block 520, the Clustering Component 120 determines whether there is at least one additional word to be evaluated. If so, the method 500 returns to block 505. Otherwise, the method 500 proceeds to block 525. At block 525, the Clustering Component 120 generates one or more clusters or groups of words based on their semantic meaning and/or their vector similarity.

The method 500 then continues to block 530, where the Clustering Component 120 selects one of the generated clusters. At block 535, the Clustering Component 120 selects a representative word for the selected cluster. In one embodiment, the Clustering Component 120 selects the word with the highest importance score to use as the representative word. In one embodiment, the Clustering Component 120 considers the semantic meaning of the words when selecting a representative word. For example, in one embodiment, if the highest-scored word is a brand name for a medication, the Clustering Component 120 can select the generic name or scientific name as the representative word for the cluster. The method 500 then proceeds to block 540.

At block 540, the Clustering Component 120 increases the importance score of the representative word. In one embodiment, this increase is based on the importance scores of the remaining words in the selected cluster. For example, in one embodiment, the Clustering Component 120 sums the importance scores of each word in the cluster, and uses this aggregate value as the importance score for the representative word (and therefore, for the cluster). The method 500 continues to block 545, where the Clustering Component 120 determines whether there is at least one cluster remaining to be processed. If so, the method 500 returns to block 530 to select the next cluster. Otherwise, the method 500 terminates.

Figure 6:
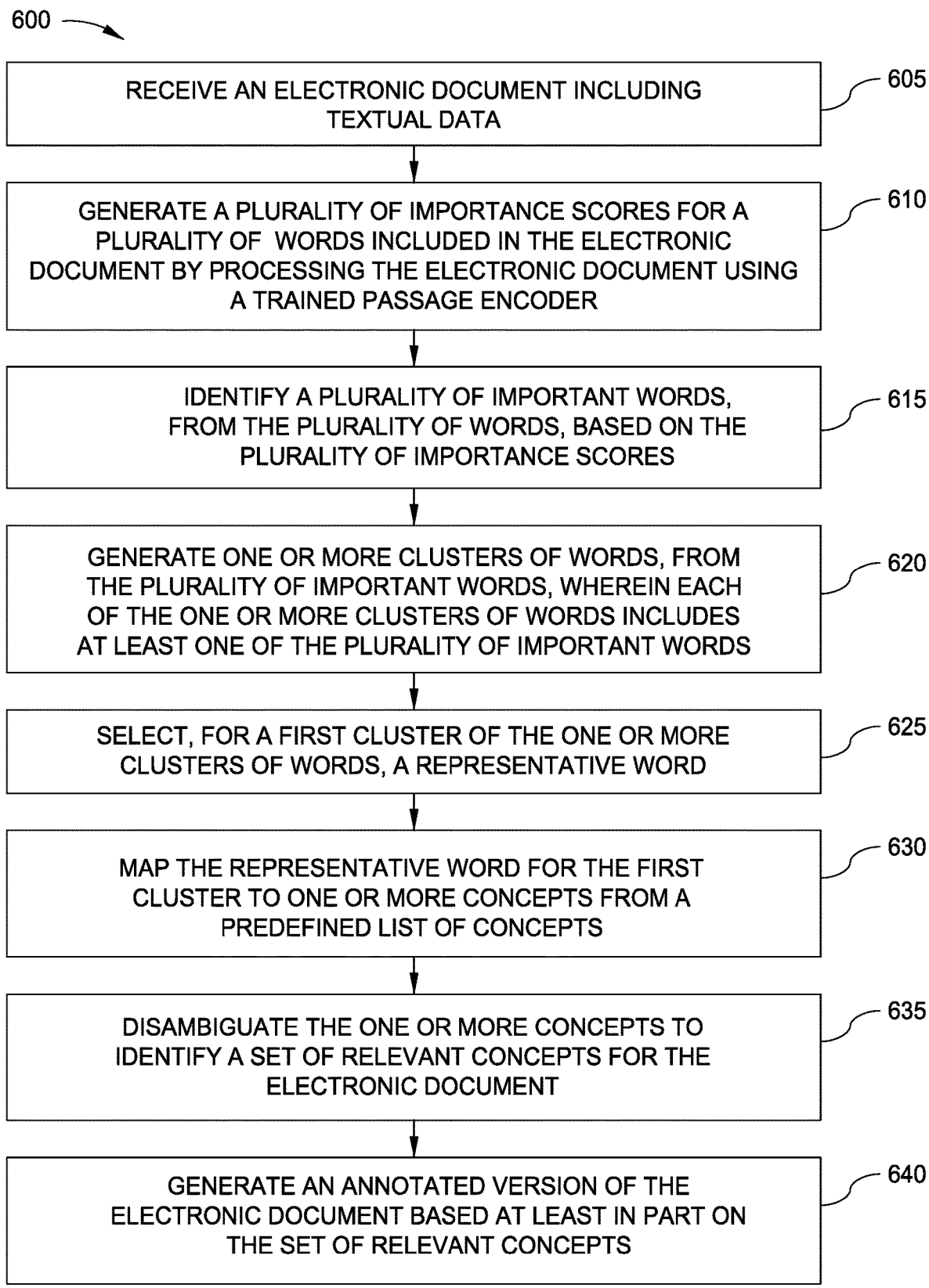
FIG. 6 is a flow diagram illustrating a method for analyzing electronic documents to improve functionality of a corpus, according to one embodiment disclosed herein.

FIG. 6 is a flow diagram illustrating a method 600 for analyzing electronic documents to improve functionality of a corpus, according to one embodiment disclosed herein. The method 600 begins at block 605, where an Analysis Application 230 receives an electronic document including textual data. At block 610, the Analysis Application 230 generates a plurality of importance scores for a plurality of words included in the electronic document by processing the electronic document using a trained passage encoder. The method 600 then proceeds to block 615, where the Analysis Application 230 identifies a plurality of important words, from the plurality of words, based on the plurality of importance scores. Further, at block 620, the Analysis Application 230 generates one or more clusters of words, from the plurality of important words, wherein each of the one or more clusters of words includes at least one of the plurality of important words. The method 600 continues to block 625, where the Analysis Application 230 selects, for a first cluster of the one or more clusters of words, a representative word. At block 630, the Analysis Application 230 maps the representative word for the first cluster to one or more concepts from a predefined list of concepts. Additionally, at block 635, the Analysis Application 230 disambiguates the one or more concepts to identify a set of relevant concepts for the electronic document. Finally, at block 640, the Analysis Application 230 generates an annotated version of the electronic document based at least in part on the set of relevant concepts.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Analysis Application 230) or related data available in the cloud. For example, the Analysis Application 230 could execute on a computing system in the cloud and evaluate documents to generate intelligent annotations. In such a case, the Analysis Application 230 could retrieve and analyze documents and store the resulting annotations at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   receiving an electronic document including textual data;
   generating a plurality of importance scores for a plurality of words included in the electronic document by processing the electronic document using a trained passage encoder;
   identifying a plurality of important words, from the plurality of words, based on the plurality of importance scores;
   generating one or more clusters of words, from the plurality of important words, wherein each of the one or more clusters of words includes at least one of the plurality of important words;
   selecting, for a first cluster of the one or more clusters of words, a representative word;
   mapping the representative word for the first cluster to one or more concepts from a predefined list of concepts;
   disambiguating, by operation of one or more computer processors, the one or more concepts to identify a set of relevant concepts for the electronic document;
   generating an annotated version of the electronic document based at least in part on the set of relevant concepts; and
   generating a plurality of terms that summarize the electronic document based on mapping the set of relevant concepts to a predefined set of search terms, wherein the predefined set of search terms comprises medical subject heading (MeSH) terms.

2. The method of claim 1, wherein identifying the plurality of important words comprises:
   generating an importance score for each word in the electronic document; and
   determining an expected importance score for the electronic document; and
   selecting words from the electronic document with an importance score exceeding the expected importance score.

3. The method of claim 1, wherein generating the one or more clusters of words comprises:
   generating, for each respective word in the plurality of important words, a respective vector; and
   clustering vectors that exceed a predefined threshold of similarity.

4. The method of claim 1, wherein the passage encoder is a recurrent neural network (RNN).

5. The method of claim 1, wherein the predefined list of concepts comprises unified medical language system (UMLS) concept unique identifiers (CUIs).

6. A computer-readable storage medium having computer-readable program code embodied therewith, the computer-readable program code executable by one or more computer processors to perform an operation comprising:
   receiving an electronic document including textual data;
   generating a plurality of importance scores for a plurality of words included in the electronic document by processing the electronic document using a trained passage encoder;
   identifying a plurality of important words, from the plurality of words, based on the plurality of importance scores;
   generating one or more clusters of words, from the plurality of important words, wherein each of the one or more clusters of words includes at least one of the plurality of important words;
   selecting, for a first cluster of the one or more clusters of words, a representative word;
   mapping the representative word for the first cluster to one or more concepts from a predefined list of concepts;
   disambiguating the one or more concepts to identify a set of relevant concepts for the electronic document;

generating an annotated version of the electronic document based at least in part on the set of relevant concepts; and generating a plurality of terms that summarize the electronic document based on mapping the set of relevant concepts to a predefined set of search terms, wherein the predefined set of search terms comprises medical subject heading (MeSH) terms.

7. The computer-readable storage medium of claim 6, wherein identifying the plurality of important words comprises:

generating an importance score for each word in the electronic document; and determining an expected importance score for the electronic document; and selecting words from the electronic document with an importance score exceeding the expected importance score.

8. The computer-readable storage medium of claim 6, wherein generating the one or more clusters of words comprises:

generating, for each respective word in the plurality of important words, a respective vector; and clustering vectors that exceed a predefined threshold of similarity.

9. The computer-readable storage medium of claim 6, wherein the passage encoder is a recurrent neural network (RNN).

10. The computer-readable storage medium of claim 6, wherein the predefined list of concepts comprises unified medical language system (UMLS) concept unique identifiers (CUIs).

11. A system comprising:

one or more computer processors; and a memory containing a program which when executed by the one or more computer processors performs an operation, the operation comprising:

receiving an electronic document including textual data;

generating a plurality of importance scores for a plurality of words included in the electronic document by processing the electronic document using a trained passage encoder;

identifying a plurality of important words, from the plurality of words, based on the plurality of importance scores;

generating one or more clusters of words, from the plurality of important words, wherein each of the one or more clusters of words includes at least one of the plurality of important words;

selecting, for a first cluster of the one or more clusters of words, a representative word;

mapping the representative word for the first cluster to one or more concepts from a predefined list of concepts;

disambiguating the one or more concepts to identify a set of relevant concepts for the electronic document;

generating an annotated version of the electronic document based at least in part on the set of relevant concepts; and generating a plurality of terms that summarize the electronic document based on mapping the set of relevant concepts to a predefined set of search terms, wherein the predefined set of search terms comprises medical subject heading (MeSH) terms.

12. The system of claim 11, wherein identifying the plurality of important words comprises:

generating an importance score for each word in the electronic document; and determining an expected importance score for the electronic document; and selecting words from the electronic document with an importance score exceeding the expected importance score.

13. The system of claim 11, wherein generating the one or more clusters of words comprises:

generating, for each respective word in the plurality of important words, a respective vector; and clustering vectors that exceed a predefined threshold of similarity.

14. The system of claim 11, wherein the passage encoder is a recurrent neural network (RNN).

* * * * *